(12) United States Patent
Sung et al.

(10) Patent No.: US 10,797,762 B1
(45) Date of Patent: Oct. 6, 2020

(54) BEAMFORMING IN MASSIVE MIMO NETWORKS

(71) Applicant: Sprint Spectrum LP, Overland Park, KS (US)

(72) Inventors: Sanghoon Sung, Ashburn, VA (US); Yun Sung Kim, Ashburn, VA (US); Minho Song, Ashburn, VA (US); Sandeep Mangrulkar, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/527,462

(22) Filed: Jul. 31, 2019

(51) Int. Cl.
*H04B 7/04* (2017.01)
*H04B 7/06* (2006.01)
*H04B 17/309* (2015.01)
*H04B 7/0417* (2017.01)

(52) U.S. Cl.
CPC ......... *H04B 7/0417* (2013.01); *H04B 7/0617* (2013.01); *H04B 7/0632* (2013.01); *H04B 17/309* (2015.01)

(58) Field of Classification Search
CPC .. H04B 7/0617; H04B 7/0626; H04B 7/0639; H04B 17/309; H04L 1/0026; H04W 16/28
See application file for complete search history.

(56) References Cited

U.S. PATENT DOCUMENTS

| | | | |
|---|---|---|---|
| 9,705,575 B2 | 7/2017 | Nam et al. | |
| 2004/0166835 A1* | 8/2004 | Johansson | H04W 28/18 455/414.1 |
| 2017/0048861 A1* | 2/2017 | Choi | H04L 1/1887 |
| 2018/0115389 A1* | 4/2018 | Chen | H04L 1/0036 |
| 2018/0278310 A1* | 9/2018 | Lee | H04B 7/0632 |
| 2018/0288756 A1* | 10/2018 | Xia | H04L 5/0023 |
| 2018/0316404 A1* | 11/2018 | Xu | H04W 24/02 |
| 2019/0036579 A1 | 1/2019 | Wei et al. | |

\* cited by examiner

*Primary Examiner* — Aristocratis Fotakis

(57) ABSTRACT

Beamforming in massive MIMO networks includes monitoring a signal condition such as pathloss of wireless devices and, based thereon, selecting a type of reference signal for the wireless devices, the type selected from among a non-precoded reference signal, a beamformed reference signal, or a standard reference signal. Further, an MCS of the wireless devices is monitored and, based thereon, the type of reference signal is adjusted.

13 Claims, 6 Drawing Sheets

BEAMFORMING IN MASSIVE MIMO NETWORKS

TECHNICAL BACKGROUND

As wireless networks evolve and grow, there are ongoing challenges in providing high-quality service to increasing numbers of wireless devices in various coverage areas of a wireless network. Wireless networks may be configured to utilize massive multiple-input multiple-output (mMIMO), in which multiple data streams can be directed towards a plurality of wireless devices that are selected to participate in a MIMO operating mode based on the orthogonality of transmission, thereby maximizing resources. MIMO has been identified as one of the promising air interface technologies to address the capacity requirement required demanded by 5G networks, and increasingly access nodes with multiple antenna arrays are being deployed in wireless networks.

However, mMIMO enabled wireless networks continue to suffer from problems similar to previous networks, such as varying signal conditions of wireless devices attached to access nodes, and inefficient formation of beams (i.e. transmission of formed beams) to said wireless devices. For example, mMIMO access nodes are configured to transmit reference signals to wireless devices attached thereto and, based on the reception of these reference signals, form beams directed (or steered) towards these wireless devices. Different types of reference signals can be transmitted from mMIMO access nodes, which use different portions of an antenna array (e.g. antenna elements) of the access nodes. The different types of reference signals can be used for, for example, open-loop and closed-loop power control of the eventually-formed beam received at the wireless device. However, each type of reference signal has a different coverage area based on the amount of power available to the different sets of antenna elements used to transmit the signal conditions. If different types of reference signals are transmitted to wireless devices that are already experiencing varying signal conditions (based on, for example, their location in the coverage area of an access node), then the reception of the reference signals is inconsistent. As a consequence, the formed beam (based on reception of the reference signal) may not adequately meet the needs of the wireless device (based on, for example, a QoS requirement, or application requirement).

Overview

Exemplary embodiments described herein include methods, systems, and processing nodes for beamforming in mMIMO networks by selecting a type of reference signal for a wireless device based on a signal condition of the wireless device. An exemplary method for beamforming in mMIMO networks includes monitoring one or more signal conditions associated with a wireless device attached to an access node, wherein the wireless device is capable of receiving a formed beam from the access node and, based on the one or more signal conditions, determining a type of a reference signal to be transmitted from the access node to the wireless device, wherein the type of reference signal comprises at least one of a non-precoded reference signal, a beamformed reference signal, or a standard reference signal.

An exemplary system for beamforming in mMIMO networks includes a processing node and a processor coupled to the processing node. The processor may be configured to perform operations including determining, based on a pathloss reported by one or more wireless devices, a type of reference signal to transmit to the one or more wireless devices, wherein the type comprises one or more of a non-precoded reference signal, a beamformed reference signal, or a standard reference signal, monitoring a modulation and coding scheme (MCS) associated with each of the one or more wireless devices and, when the MCS of at least one wireless device degrades, selecting a different type of reference signal to transmit to the at least one wireless device.

An exemplary processing node for beamforming in mMIMO networks is configured to perform operations including monitoring a first signal condition associated with a wireless device, based on the first signal condition, configuring the wireless device to receive a first type of reference signal, monitoring a second signal condition associated with the wireless device and, based on the second signal condition, configuring the wireless device to receive a second type of reference signal, wherein the first type of reference signal is selected from among a non-precoded reference signal, a beamformed reference signal, or a standard reference signal.

DETAILED DESCRIPTION

Figure 1:
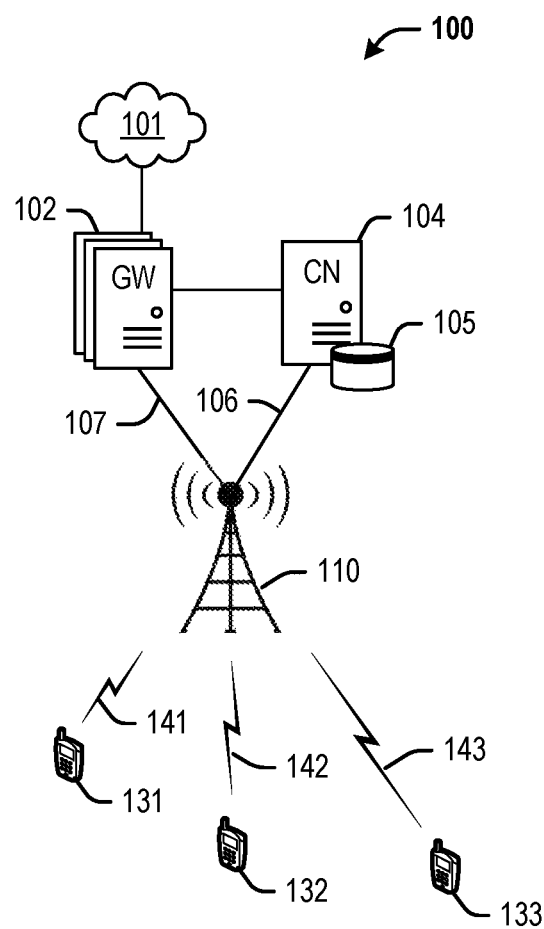
FIG. 1 illustrates an exemplary system for mitigating interference caused by external networks.

The disclosed embodiments illustrate methods, systems, and processing nodes for beamforming in mMIMO wireless networks by selecting different types of reference signals to be transmitted to wireless devices based on signal conditions of the wireless devices. Generally, embodiments disclosed herein are configured to perform operations including monitoring a first signal condition associated with a wireless device attached to an access node, and configuring the wireless device to receive a first type of reference signal based on the first signal condition. The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Thus, in exemplary embodiments described herein, the one or more wireless devices may be operating within a sector deployed an antenna array of the access node.

Further, the types of reference signals include a non-precoded reference signal, a beamformed reference signal, or a standard reference signal. In an exemplary embodiment, the first signal condition can include a pathloss associated with the wireless device. Thus, the first type of reference signal is selected for the wireless device based on a reported pathloss from the wireless device. For example, if the pathloss is below a threshold, the wireless device is configured to receive one of the non-precoded reference signal or the beamformed reference signal. In exemplary embodiments, different thresholds for the pathloss are used to determine which of the non-precoded reference signal or the beamformed reference signal to transmit to the wireless device. Conversely, if the pathloss is above the threshold, the wireless device is configured to receive the standard reference signal. Since the standard reference signals are generally broadcast throughout a coverage area or sector of the access node (using, for example, all available antenna elements of the access node), these reference signals are not device specific, and can thus be used as a backup mechanism when the device-specific reference signals (i.e. non-precoded reference signals or beamformed reference signals) are not being transmitted to the wireless devices. Thus, when the signal condition is poor (i.e. the pathloss is high), the wireless device receives the standard reference signal that covers a greater coverage area, and can report back measurements accordingly, whereas when the signal condition is good (i.e. the pathloss is low), the wireless device receives a beamformed or non-precoded reference signal that may have a smaller coverage area, but is targeted specifically to the wireless device.

Further, the operations can include monitoring a second signal condition associated with the wireless device, and configuring the wireless device to receive a second type of reference signal based on the second signal condition. For example, while the first signal condition included a pathloss based on which the first type of reference signal was determined, the second signal condition can include a modulation and coding scheme (MCS) associated with the wireless device. Based on the MCS of the wireless device, the type of reference signal can be changed from a first type to a second type. For example, when the MCS degrades (i.e. falls to a lower-order MCS from a currently-utilized MCS), the wireless device can be configured to receive the standard reference signal. In some embodiments, after a time period, the pathloss may be measured again, and the type of reference signal based thereon may be changed back to the first type of reference signal (i.e. either the beamformed or the non-precoded reference signal).

Thus, an exemplary method for beamforming disclosed herein includes monitoring one or more signal conditions associated with a wireless device attached to an access node, wherein the wireless device is capable of receiving a formed beam from the access node, and based on the one or more signal conditions, determining a type of a reference signal to be transmitted from the access node to the wireless device, wherein the type of reference signal comprises at least one of a non-precoded reference signal, a beamformed reference signal, or a standard reference signal. Measurement reports from the wireless device about the received reference signal enable the access node to determine how to generate a formed beam for the wireless device. Consequently, selecting the appropriate type of reference signal based on the signal conditions of the wireless device is essential to transmitting a formed beam that the wireless device will be able to receive. For example, the access node receives channel state information from the wireless device based on the reference signal transmitted to the wireless device, and directs the formed beam towards the wireless device based on the channel state information.

As described herein, the signal condition can include a pathloss reported by the wireless device. The pathloss can be determined based on one or more of an uplink sounding reference signal, an uplink transmit power headroom report, or a reference signal receive power measured at the wireless device. Further, the type of the reference signal can be determined based on whether or not the pathloss meets one or more thresholds. For example, the non-precoded reference signal is selected when the pathloss is below a first threshold, the standard reference signal is selected when the pathloss is above a second threshold, and the beamformed reference signal is selected when the pathloss is between the first and second thresholds. Further, the wireless device can be one of a plurality of wireless devices attached to the access node, and can be categorized (along with each of the plurality of wireless devices) into one or more categories based on the pathloss reported from each wireless device. Subsequently, the type of reference signal for each group or category is determined based on the pathloss. In an exemplary embodiment, the one or more signal conditions further includes a modulation and coding scheme (MCS), such that when the MCS degrades, a different type of reference signal is determined for the wireless device. The categorizing based on pathloss, determining the type of reference signal, and subsequent monitoring of the MCS can be repeated at defined time intervals.

Thus, exemplary embodiments described herein are configured to perform operations including determining, based on a pathloss reported by one or more wireless devices, a type of reference signal to transmit to the one or more wireless devices. The type comprises one or more of a non-precoded reference signal, a beamformed reference signal, or a standard reference signal. Subsequent to determining the type of reference signal (which includes transmitting the reference signal to the wireless devices and waiting for a time period), an MCS associated with each wireless device can be monitored, and when the MCS of at least one wireless device degrades, a different type of reference signal is transmitted to the at least one wireless device. As described herein, the one or more wireless devices can be categorized based on the pathloss into a low pathloss category, a medium pathloss category, and a high pathloss category. For example, wireless devices are categorized into the low pathloss category when the pathloss is below a first threshold, into the high pathloss category when the pathloss is above a second threshold, and into the medium pathloss category when the pathloss is between the first and second thresholds. Correspondingly, non-precoded reference signals are transmitted to the low pathloss category, beamformed reference signals are transmitted to the medium pathloss category, and standard reference signals are transmitted to the high pathloss category. Since the standard reference signals are generally broadcast throughout a coverage area of the access node (using, for example, all available antenna elements of the access node), these reference signals are not device specific, and can thus be used as a backup mechanism when the device-specific reference signals (i.e. non-precoded reference signals or beamformed reference signals) are not being transmitted to the wireless devices.

Similar operations may be performed by an exemplary system described herein and comprising at least a processing node and a processor coupled to the processing node. The processing node can be communicatively coupled to any other network node within the wireless network, such as an access node or a controller node. These and other embodiments are further described herein and with reference to FIGS. 1-6.

FIG. 1 depicts an exemplary system 100 for mitigating interference. System 100 comprises a communication network 101, gateway 102, controller node 104, access node 110, and wireless devices 131, 132, 133. Access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams to wireless devices attached thereto, including wireless devices 131-133. Access node 110 communicates with wireless devices 131-133 over corresponding wireless communication links 141, 142, 143, which can include direct communication links, formed beams, multiple-input-multiple-output (MIMO), and so on.

As described herein, a processing node communicatively coupled to any network node within system 100 (such as, for example, access node 110 or controller node 104) can be configured to select different types of reference signals to be transmitted to wireless devices 131-133 based on signal conditions of the wireless devices 131-133. For example, a first signal condition associated with each wireless device 131-133 is monitored, and each wireless device 131-133 is configured to receive a type of reference signal based on the first signal condition. The types of reference signals include a non-precoded reference signal, a beamformed reference signal, or a standard reference signal. Further, the first signal condition can include a pathloss associated with the wireless device 131-133. For example, if the pathloss for wireless device 131 is below a threshold (by virtue of, for instance, wireless device 131 being closer to access node 110 than wireless devices 132-133), the wireless device 131 is configured to receive one of the non-precoded reference signal or the beamformed reference signal. If the pathloss for wireless device 132 is above the first threshold and below a second threshold, wireless device 132 is configured to receive the beamformed reference signal. If the pathloss for wireless device 133 is above the second threshold (since wireless device 133 is a large distance from access node 110 relative to the other wireless devices 131-132), then wireless device 133 is configured to receive the standard reference signal. Since the standard reference signals are generally broadcast throughout a coverage area or sector of the access node 110, these reference signals are not device specific, and can thus be used as a backup mechanism when the device-specific reference signals (i.e. non-precoded reference signals or beamformed reference signals) are not being transmitted to the wireless devices. Thus, when the signal condition is poor (i.e. the pathloss is high), the wireless device 133 receives the standard reference signal that covers a greater coverage area, and can report back measurements accordingly, whereas when the signal condition is good (i.e. the pathloss is low), the wireless devices 131-132 receive a beamformed or non-precoded reference signal that may have a smaller coverage area, but is targeted specifically to the wireless device 131-132.

Further, system 100 can be configured to monitor a second signal condition associated with each wireless device 131-133, and configure the wireless device 131-133 to receive a second type of reference signal based on the second signal condition. For example, while the first signal condition included a pathloss based on which the first type of reference signal was determined, the second signal condition can include a modulation and coding scheme (MCS) associated with each wireless device 131-133. Based on the MCS of the wireless device 131-133, the type of reference signal can be changed from a first type to a second type. For example, when the MCS of wireless device 132 degrades (i.e. falls to a lower-order MCS from a currently-utilized MCS), the wireless device 132 can be configured to receive the standard reference signal. The pathloss of wireless device 132 may be measured again after a time period, and if the pathloss is below the second threshold (or considered a "medium" pathloss), the type of reference signal may be changed back to the first type of reference signal (i.e. the beamformed reference signal). Measurement reports from each wireless device 131-133 about the received reference signal enable the access node 110 to determine how to generate a formed beam for the wireless device 131-133. Consequently, selecting the appropriate type of reference signal based on the signal conditions of wireless devices 131-133 is essential to transmitting a formed beam that the wireless device 131-133 will be able to receive. For example, the access node 110 receives channel state information from each wireless device 131-133 based on the reference signal transmitted to the wireless device 131-133, and directs the formed beam towards the wireless device 131-133 based on the channel state information.

As described herein, the first signal condition can include a pathloss reported by each wireless device 131-133. The pathloss can be determined based on one or more of an uplink sounding reference signal (transmitted via, for example, communication links 141-143 respectively), an uplink transmit power headroom report, or a reference signal receive power measured at the wireless device. In an exemplary embodiment, the reference signal receive power measured at the wireless device is subsequent to a handover of the wireless device from another access node to access node 110. Further, the type of the reference signal can be determined based on whether or not the pathloss meets one or more thresholds. For example, the non-precoded reference signal is selected when the pathloss is below a first threshold, the standard reference signal is selected when the pathloss is above a second threshold, and the beamformed reference signal is selected when the pathloss is between the first and second thresholds.

Further, each wireless device 131-133 can be categorized into one or more categories based on the pathloss reported from each wireless device 131-133. The wireless devices 131-133 can be categorized based on the pathloss into a low pathloss category, a medium pathloss category, and a high pathloss category. For example, wireless devices 131-133 are categorized into the low pathloss category when the pathloss is below a first threshold, into the high pathloss category when the pathloss is above a second threshold, and into the medium pathloss category when the pathloss is between the first and second thresholds. Subsequently, the type of reference signal for each group or category is determined based on the pathloss. For example, non-precoded reference signals are transmitted to the low pathloss category, beamformed reference signals are transmitted to the medium pathloss category, and standard reference signals are transmitted to the high pathloss category. Since the standard reference signals are generally broadcast throughout a coverage area of the access node (using, for example, all available antenna elements of the access node), these reference signals are not device specific, and can thus be used as a backup mechanism when the device-specific reference signals (i.e. non-precoded reference signals or beamformed reference signals) are not being transmitted to the wireless devices. The categorizing based on pathloss, determining the type of reference signal, and subsequent monitoring of the MCS can be repeated at defined time intervals.

Access node 110 can be any network node configured to provide communication between wireless devices 131-133 and communication network 101, including standard access nodes and/or short range, low power, small access nodes.

For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 and wireless devices 131-133 are illustrated in FIG. 1, any number of access nodes and wireless devices can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicate with gateway node 102 and controller node 104 via communication links 106, 107. Access node 110 may communicate with other access nodes (not shown) using a direct link such as an X2 link or similar.

Wireless devices 131-133 may be any device, system, combination of devices, or other such communication platform capable of communicating wirelessly with access node 110 using one or more frequency bands deployed therefrom. Wireless devices 131-133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as mMIMO capabilities and historical signal conditions for wireless devices attached to access node 110, MCS levels thereof, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
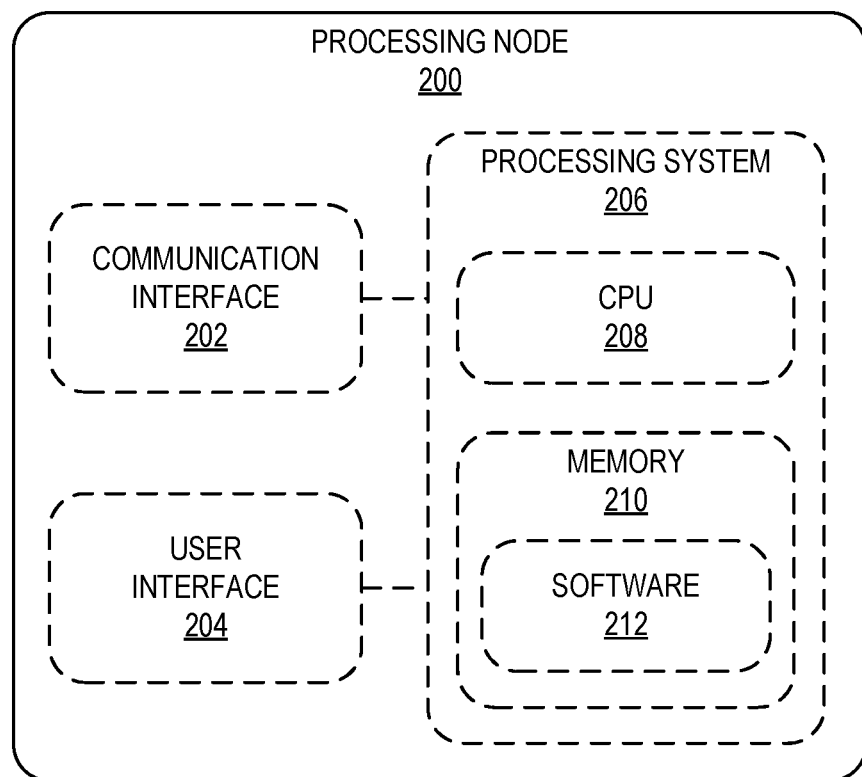
FIG. 2 illustrates an exemplary processing node for mitigating interference caused by external networks.

FIG. 2 depicts an exemplary processing node 200 for beamforming in a mMIMO wireless network. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements.

User interface 204 permits the configuration and control of the operation of processing node 200.

In an exemplary embodiment, software 212 includes instructions that enable processing node 200 to perform operations including monitoring one or more signal conditions associated with a wireless device attached to an access node, wherein the wireless device is capable of receiving a formed beam from the access node and, based on the one or more signal conditions, determining a type of a reference signal to be transmitted from the access node to the wireless device, wherein the type of reference signal comprises at least one of a non-precoded reference signal, a beamformed reference signal, or a standard reference signal. In another exemplary embodiment, software 212 includes instructions that enable processing node 200 to perform operations including determining, based on a pathloss reported by one or more wireless devices, a type of reference signal to transmit to the one or more wireless devices, wherein the type comprises one or more of a non-precoded reference signal, a beamformed reference signal, or a standard reference signal, monitoring a modulation and coding scheme (MCS) associated with each of the one or more wireless devices and, when the MCS of at least one wireless device degrades, selecting a different type of reference signal to transmit to the at least one wireless device. In yet another exemplary embodiment, software 212 includes instructions that enable processing node 200 to perform operations including monitoring a first signal condition associated with a wireless device, based on the first signal condition, configuring the wireless device to receive a first type of reference signal, monitoring a second signal condition associated with the wireless device and, based on the second signal condition, configuring the wireless device to receive a second type of reference signal, wherein the first type of reference signal is selected from among a non-precoded reference signal, a beamformed reference signal, or a standard reference signal.

Figure 3:
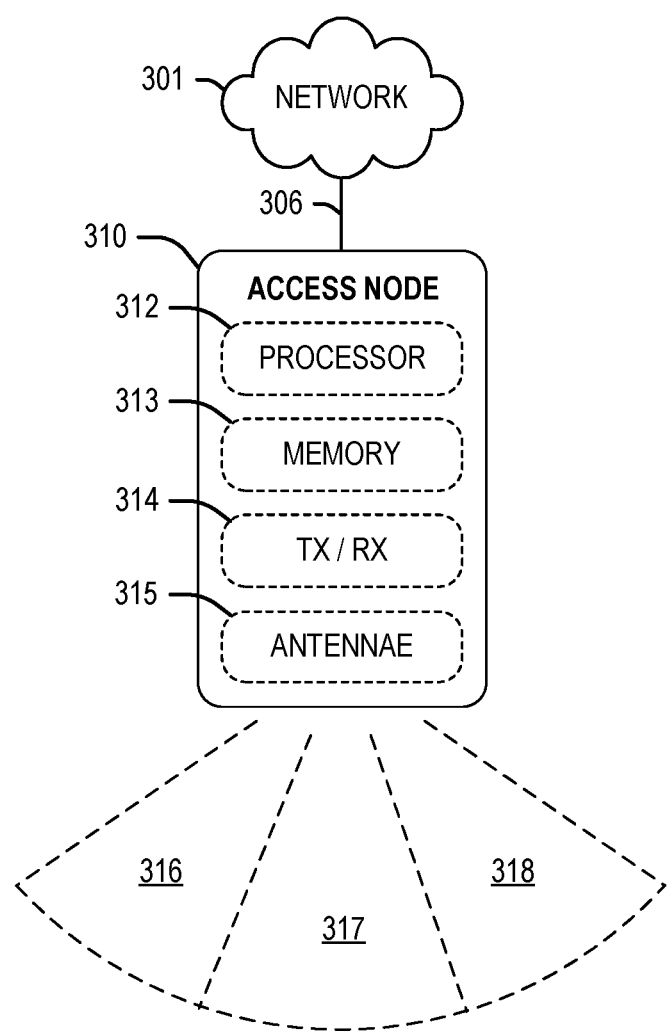
FIG. 3 illustrates an exemplary access node for mitigating interference caused by external networks.

FIG. 3 depicts an exemplary access node 310 for selecting a subcarrier spacing in a wireless network. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over wireless sectors 316, 317, and 318. One pair of transceivers and antennae are illustrated herein solely to simplify the written description, and it may be evident to those having ordinary skill in the art, that any combination of transceivers and antennae may be incorporated in order to deploy different sectors that are configured to utilize mMIMO, which includes formed beams, MU-MIMO data streams, and/or to facilitate communication with other network nodes on network 301. Further, access node 310 is communicatively coupled to network 301 via communication interface 306, which may be any wired or wireless link as described above.

In an exemplary embodiment, memory 313 includes instructions that enable access node 310 to perform operations including monitoring one or more signal conditions associated with a wireless device attached to an access node, wherein the wireless device is capable of receiving a formed beam from the access node and, based on the one or more signal conditions, determining a type of a reference signal to be transmitted from the access node to the wireless device, wherein the type of reference signal comprises at least one of a non-precoded reference signal, a beamformed reference signal, or a standard reference signal. In another exemplary embodiment, the instructions in memory 313 include determining, based on a pathloss reported by one or more wireless devices, a type of reference signal to transmit to the one or more wireless devices, wherein the type comprises one or more of a non-precoded reference signal, a beamformed reference signal, or a standard reference signal, monitoring a modulation and coding scheme (MCS) associated with each of the one or more wireless devices and, when the MCS of at least one wireless device degrades, selecting a different type of reference signal to transmit to the at least one wireless device. In yet another exemplary embodiment, the instructions in memory 313 include monitoring a first signal condition associated with a wireless device, based on the first signal condition, configuring the wireless device to receive a first type of reference signal, monitoring a second signal condition associated with the wireless device and, based on the second signal condition, configuring the wireless device to receive a second type of reference signal, wherein the first type of reference signal is selected from among a non-precoded reference signal, a beamformed reference signal, or a standard reference signal.

Figure 4:
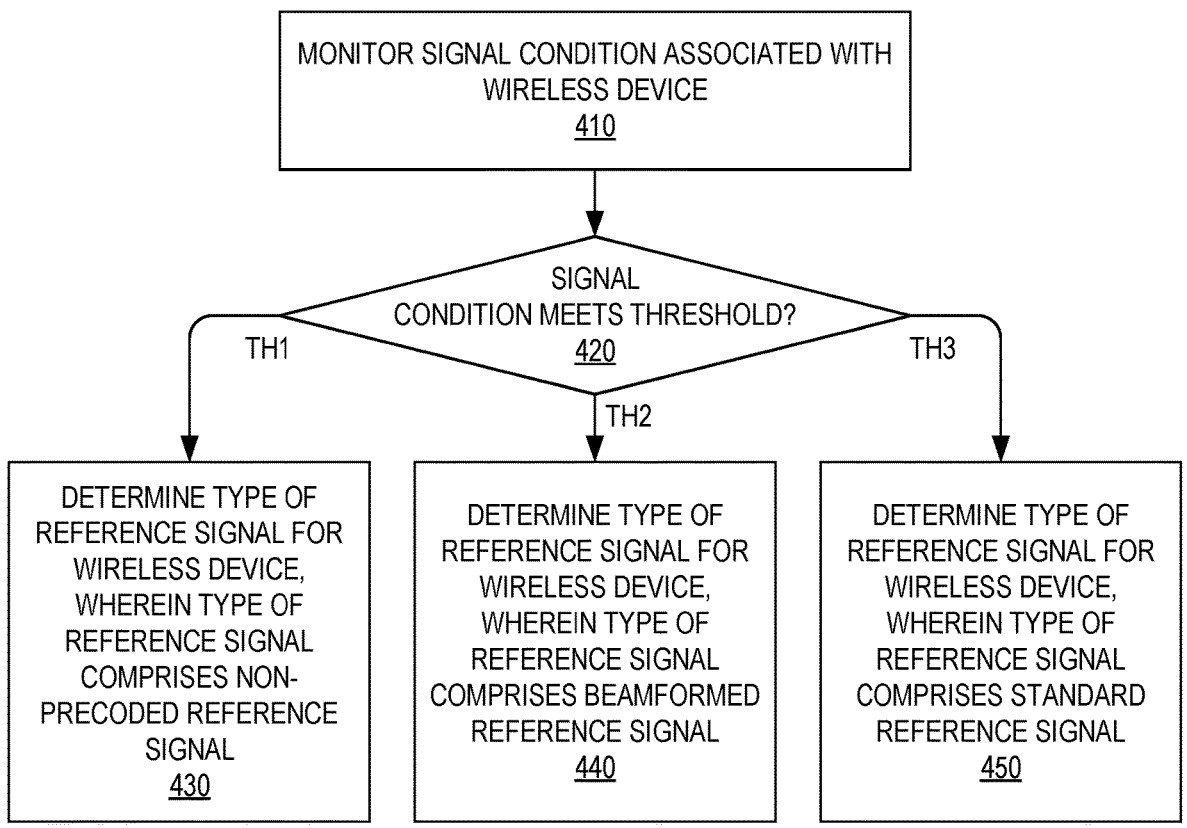
FIG. 4 illustrates an exemplary method for mitigating interference caused by external networks.

FIG. 4 illustrates an exemplary method for beamforming in mMIMO networks. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, a first signal condition associated with a wireless device attached to an access node is monitored and, at 420, the signal is compared to one or more thresholds. Subsequently, at 430, 440, and 450, a type of reference signal is determined for the wireless device based on the first signal condition. For example, the access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Further, the first signal condition can include a pathloss associated with the wireless device, and the types of reference signals include a non-precoded reference signal, a beamformed reference signal, or a standard reference signal. Thus, the first type of reference signal is selected for the wireless device based on a reported pathloss from the wireless device. For example, if the pathloss is below a threshold, at 430 or 440, the wireless device is configured to receive one of the non-precoded reference signal or the beamformed reference signal. In exemplary embodiments, different thresholds TH1 and TH2 for the pathloss are used to determine which of the non-precoded reference signal or the beamformed reference signal to transmit to the wireless device. Conversely, if the pathloss is above the threshold (i.e. TH3), the wireless device is configured to receive the standard reference signal. Since the standard reference signals are generally broadcast throughout a coverage area or sector of the access node (using, for example, all available antenna elements of the access node), these reference signals are not device specific, and can thus be used as a backup mechanism when the device-specific reference signals (i.e. non-precoded reference signals or beamformed reference signals) are not being transmitted to the wireless devices. Thus, when the signal condition is poor (i.e. the pathloss is high at TH3), the wireless device receives the standard reference signal that covers a greater coverage area, and can report back measurements accordingly, whereas when the signal condition is good (i.e. the pathloss is low at TH1 or TH2), the wireless device receives a beamformed or non-precoded reference signal that may have a smaller coverage area, but is targeted specifically to the wireless device.

Figure 5:
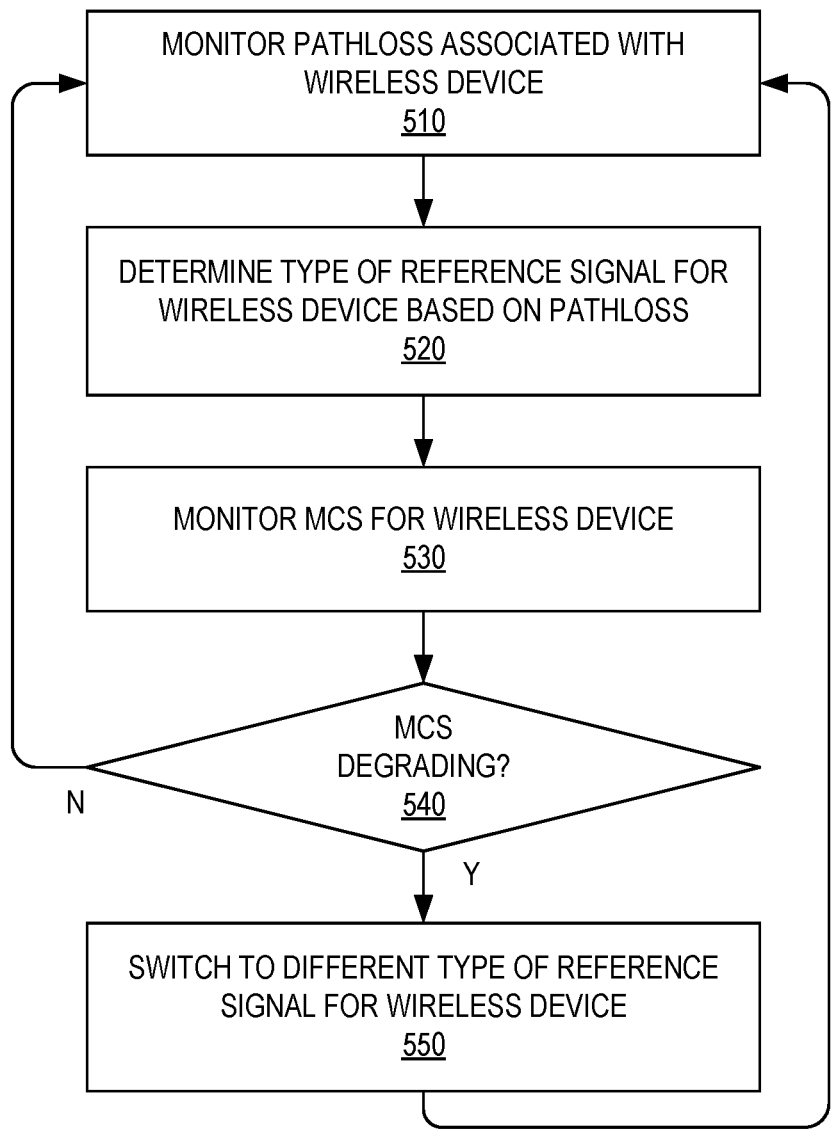
FIG. 5 illustrates another exemplary method for mitigating interference caused by external networks.

FIG. 5 illustrates another exemplary method for beamforming in mMIMO networks. The method will be discussed with reference to the exemplary communication system 100 illustrated in FIG. 1. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 510, a pathloss associated with a wireless device attached to an access node is monitored and, at 520, a type of reference signal is determined for the wireless device based on the pathloss. The types of reference signals include a non-precoded reference signal, a beamformed reference signal, or a standard reference signal. For example, if the pathloss is below a threshold, the wireless device is configured to receive one of the non-precoded reference signal or the beamformed reference signal. In exemplary embodiments, different thresholds for the pathloss are used to determine which of the non-precoded reference signal or the beamformed reference signal to transmit to the wireless device. Conversely, if the pathloss is above the threshold, the wireless device is configured to receive the standard reference signal. Since the standard reference signals are generally broadcast throughout a coverage area or sector of the access node (using, for example, all available antenna elements of the access node), these reference signals are not device specific, and can thus be used as a backup mechanism when the device-specific reference signals (i.e. non-precoded reference signals or beamformed reference signals) are not being transmitted to the wireless devices. Thus, when the signal condition is poor (i.e. the pathloss is high), the wireless device receives the standard reference signal that covers a greater coverage area, and can report back measurements accordingly, whereas when the signal condition is good (i.e. the pathloss is low), the wireless device receives a beamformed or non-precoded reference signal that may have a smaller coverage area, but is targeted specifically to the wireless device.

Further, at 530 and 540, an MCS associated with the wireless device is monitored for degradation, and at 550, the wireless device is configured to receive a different type of reference signal based on the MCS. For example, when the MCS degrades at 540 (i.e. falls to a lower-order MCS from a currently-utilized MCS), the wireless device can be configured to receive the standard reference signal at 550. In some embodiments, after a time period, the pathloss may be measured again at 510, and the type of reference signal based thereon may be changed back to the first type of reference signal (i.e. either the beamformed or the non-precoded reference signal).

Figure 6:
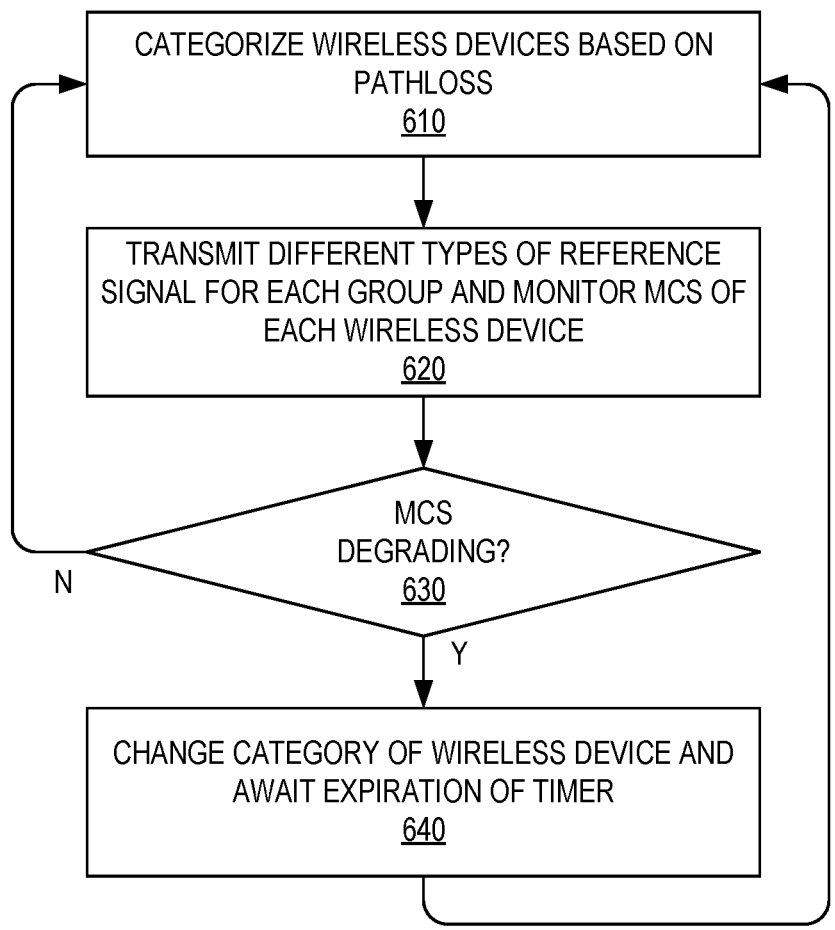
FIG. 6 illustrates another exemplary method for mitigating interference caused by external networks.

FIG. 6 illustrates another exemplary method for beamforming in mMIMO networks. The method will be discussed with reference to the exemplary communication system 100 illustrated in FIG. 1. However, the method can be implemented with any suitable communication system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 610, one or more wireless devices attached to an access node can be categorized based on the pathloss into a low pathloss category, a medium pathloss category, and a high pathloss category. For example, wireless devices are categorized into the low pathloss category when the pathloss is below a first threshold, into the high pathloss category when the pathloss is above a second threshold, and into the medium pathloss category when the pathloss is between the first and second thresholds. Correspondingly, at 620, different types of reference signals are transmitted to wireless devices in each category. For example, non-precoded reference signals are transmitted to the low pathloss category, beamformed reference signals are transmitted to the medium pathloss category, and standard reference signals are transmitted to the high pathloss category. Since the standard reference signals are generally broadcast throughout a coverage area of the access node (using, for example, all available antenna elements of the access node), these reference signals are not device specific, and can thus be used as a backup mechanism when the device-specific reference signals (i.e. non-precoded reference signals or beamformed reference signals) are not being transmitted to the wireless devices.

Further at 620, an MCS associated with the wireless device is monitored for degradation and, if degradation is determined at 630, the wireless device is configured to receive a different type of reference signal at 640 based on the MCS. For example, when the MCS degrades at 630 (i.e. falls to a lower-order MCS from a currently-utilized MCS), the wireless device can be configured to receive the standard reference signal at 640. After a time period, the categorization based on pathloss may be repeated at 610, and the type of reference signal based thereon may be changed back to the first type of reference signal (i.e. either the beamformed or the non-precoded reference signal) at 620.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the disclosure. The following claims specify the scope of the disclosure. Note that some aspects of the best mode may not fall within the scope of the disclosure as specified by the claims. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A method for beamforming in massive multiple-input multiple-output (mMIMO) networks, the method comprising:
    monitoring one or more signal conditions associated with a wireless device attached to an access node, wherein the one or more signal conditions comprise a pathloss reported by the wireless device, and wherein the wireless device is capable of receiving a formed beam from the access node; and
    determining a type of a reference signal to be transmitted from the access node to the wireless device based on whether or not the pathloss meets one or more thresholds,
    wherein a non-precoded reference signal is selected when the pathloss is below a first threshold, a standard reference signal is selected when the pathloss is above a second threshold, and a beamformed reference signal is selected when the pathloss is between the first and second thresholds.

2. The method of claim 1, further comprising determining the pathloss based on one or more of an uplink sounding reference signal, an uplink transmit power headroom report, or a reference signal receive power measured at the wireless device.

3. The method of claim 1, wherein the wireless device is one of a plurality of wireless devices attached to the access node, the method further comprising:
    categorizing each wireless device in the plurality of wireless devices into one or more groups based on the pathloss; and
    determining the type of the reference signal for each group.

4. The method of claim 1, wherein the one or more signal conditions further comprises a modulation and coding scheme (MCS), the method further comprising:
    determining that the MCS degrades; and
    determining a different type of reference signal for the wireless device.

5. The method of claim 4, further comprising waiting a time period before repeating the monitoring and determining operations.

6. The method of claim 1, further comprising: receiving channel state information from the wireless device based on the reference signal transmitted to the wireless device; and
    directing a formed beam towards the wireless device based on the channel state information.

7. A system for beamforming in massive multiple-input multiple-output (mMIMO) networks, the system comprising:
    a processing node; and
    a processor coupled to the processing node, the processor being configured to perform operations comprising:
        monitoring one or more signal conditions associated with one or more wireless devices attached to an access node, wherein the one or more signal conditions comprise a pathloss reported by the one or more wireless devices;

categorizing the one or more wireless devices into a low pathloss category when the pathloss is below a first threshold, the high pathloss category when the pathloss is above a second threshold, and the medium pathloss category when the pathloss is between the first and second thresholds; and determining to transmit a non-precoded reference signal to the low pathloss category, a beamformed reference signal to the medium pathloss category, and a standard reference signal to the high pathloss category.

8. The system of claim 7, wherein the operations further comprise:

periodically receiving the pathloss from each wireless device; and repeating the determining and monitoring operations within each period.

9. The system of claim 7, wherein the operations further comprise:

monitoring a modulation and coding scheme (MCS) associated with each of the one or more wireless devices; and when the MCS of at least one wireless device degrades, selecting a different type of reference signal to transmit to the at least one wireless device, wherein the MCS of the at least one wireless device degrades when the at least one wireless device is configured to utilize a lower-order MCS than a current MCS.

10. The system of claim 9, wherein selecting the different type of reference signal when the MCS degrades comprises configuring the at least one wireless device to receive the standard reference signal.

11. The system of claim 7, wherein the pathloss is based on one or more of an uplink sounding reference signal, an uplink transmit power headroom report, or a reference signal receive power measured at the wireless device.

12. A processing node for beamforming in massive multiple-input multiple-output (mMIMO) networks, the processing node being configured to perform operations comprising:

monitoring a first signal condition associated with a wireless device, wherein the first signal condition comprises a pathloss reported by the wireless device; and determining a type of a reference signal to be transmitted from the access node to the wireless device based on whether or not the pathloss meets one or more thresholds, wherein a non-precoded reference signal is selected when the pathloss is below a first threshold, a standard reference signal is selected when the pathloss is above a second threshold, and a beamformed reference signal is selected when the pathloss is between the first and second thresholds.

13. The processing node of claim 12, wherein the operations further comprise monitoring a second signal condition associated with the wireless device, wherein the second signal condition comprises a modulation and coding scheme associated with the wireless device, and based on the second signal condition, configuring the wireless device to receive a different type of reference signal.

* * * * *